US012366939B2

(12) United States Patent
Sato et al.

(10) Patent No.: US 12,366,939 B2
(45) Date of Patent: Jul. 22, 2025

(54) COORDINATE INPUT APPARATUS

(71) Applicant: Alps Alpine Co., Ltd., Tokyo (JP)

(72) Inventors: Akira Sato, Miyagi-ken (JP); Satoshi Nakajima, Miyagi-ken (JP); Tomohiro Sasaki, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 18/393,383

(22) Filed: Dec. 21, 2023

(65) Prior Publication Data

US 2024/0241601 A1 Jul. 18, 2024

(30) Foreign Application Priority Data

Jan. 18, 2023 (JP) .................. 2023-005966

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
None
See application file for complete search history.

(56) References Cited

U.S. PATENT DOCUMENTS

2012/0319994 A1* 12/2012 Hatano ............... G06F 3/04186
  345/174
2015/0015538 A1* 1/2015 Tanaka .................. G06F 3/0445
  345/174

FOREIGN PATENT DOCUMENTS

JP         2013-003978         1/2013

* cited by examiner

*Primary Examiner* — Andre L Matthews
(74) *Attorney, Agent, or Firm* — Beyer Law Group LLP

(57) ABSTRACT

A coordinate input apparatus includes an insulating substrate, sensor electrodes having detecting positions, a top panel including an operating surface that allows an operation with a pointer and covering the sensor electrodes, a measuring circuit that measures capacitances of the detecting positions, and a calculating circuit that calculates a position of the pointer in two-axis directions of the operating surface, wherein, at a detecting position at which a maximum measured value is obtained and detecting positions next to the detecting position, the calculating circuit applies a quadratic curve to the maximum value and the measured values measured at the adjacent detecting positions to calculate a position of a vertex of the quadratic curve, and wherein, when the detecting position at which the maximum value is obtained is at an extreme end in either of the two-axis directions, the calculating circuit corrects the position of the pointer toward the extreme end.

5 Claims, 10 Drawing Sheets

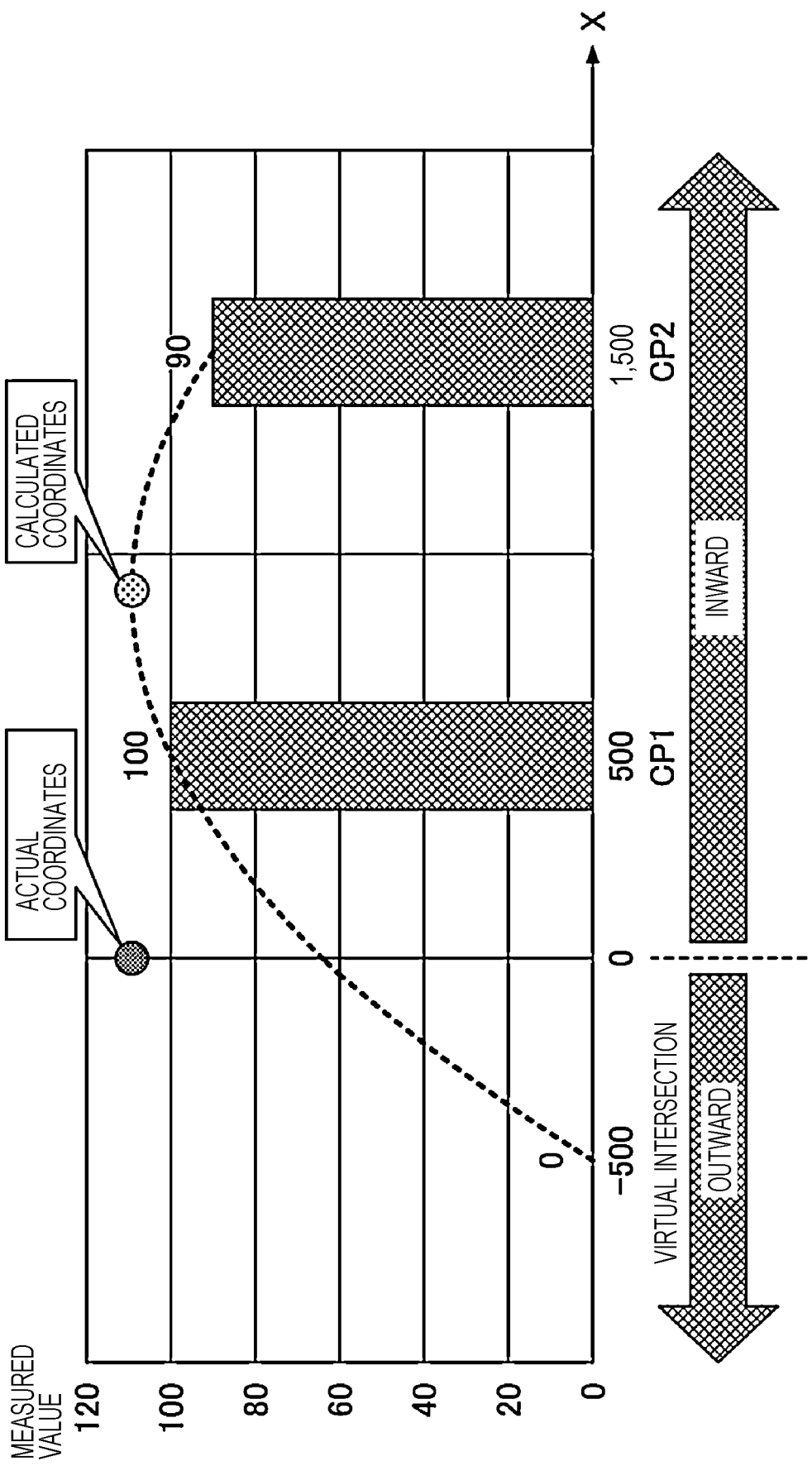

FIG. 8A

| MEASURED VALUE | CORRECTION FACTOR |
|---:|---:|
| 0 | 16.2 |
| 40 | 16.2 |
| 79 | 16.2 |
| 80 | 16.2 |
| 160 | 15.0 |
| 230 | 13.9 |
| 460 | 10.3 |
| 690 | 6.7 |
| 920 | 3.1 |
| 1,000 | 1.9 |
| 1,001 | 1.9 |
| 1,500 | 1.9 |

# COORDINATE INPUT APPARATUS

CLAIM OF PRIORITY

This application claims benefit of Japanese Patent Application No. 2023-005966 filed on Jan. 18, 2023, which is hereby incorporated by reference.

BACKGROUND OF THE INVENTION

1. Field of the Invention

The present disclosure relates to coordinate input apparatuses.

2. Description of the Related Art

A known coordinate input apparatus includes a plurality of electrodes arranged side by side in a predetermined direction, detectors that detect the respective capacitances of the plurality of electrodes, and an arithmetic processor that calculates the coordinates of the detection target using different calculation methods according to the amount of change in the capacitances of the plurality of electrodes, wherein the arithmetic processor calculates the coordinates of the detection target by switching between a center-of-gravity calculation method for calculating the coordinates of the center of gravity and a curve approximation method for finding the vertex of a curve according to the value of comparison of capacitance change between a peak electrode and electrodes not next to the peak electrode (for example, see US Patent Application Publication No. 2012/0319994).

Coordinate input apparatuses that use a curve approximation method that applies a quadratic curve to capacitances obtained at three points, including a detection position at which the maximum capacitance is obtained and its neighboring positions, to detect the position of the vertex of the quadratic curve as the position of a hand or another pointer have the following problems. When the detection position at which the maximum capacitance is obtained is the endmost detecting position of the coordinate input apparatus, the vertex of the quadratic curve shifts to the opposite side from the endmost side, resulting a decrease in the accuracy of detection of the pointer.

SUMMARY OF THE INVENTION

The present disclosure provides a coordinate input apparatus with improved detection accuracy while using the curve approximation calculation method.

A coordinate input apparatus according to an embodiment of the present disclosure includes an insulating substrate, a plurality of sensor electrodes having a plurality of detecting positions and provided on the insulating substrate, a top panel including an operating surface that allows an operation with a pointer, the top panel covering the plurality of sensor electrodes, a measuring circuit configured to measure a capacitance of each of the plurality of detecting positions, and a calculating circuit configured to calculate a position of the pointer in two-axis directions of the operating surface based on a measured value of the capacitance of each of the plurality of detecting positions, wherein, at three points of a detecting position at which a maximum value, among the plurality of measured values measured at the plurality of detecting positions, is obtained and detecting positions adjacent to the detecting position at which the maximum value is obtained in either of the two-axis directions, the calculating circuit applies a quadratic curve to the maximum value and the measured values measured at the adjacent detecting positions to calculate a position of a vertex of the quadratic curve as a position of the pointer in either of the two-axis directions of the operating surface, and wherein, when the detecting position at which the maximum value is obtained is a detecting position, among the plurality of detecting positions, that is at an extreme end in either of the two-axis directions, the calculating circuit corrects the position of the pointer, obtained as the position of the vertex of the applied quadratic curve, toward the extreme end in either of the two-axis directions.

BRIEF DESCRIPTION OF THE DRAWINGS

FIG. 7 is a graph illustrating an example of deviation in the position of the vertex of a quadratic curve determined using a curve approximation method;

FIG. 8A is a diagram showing correction factors for use in correcting the calculated coordinates of the fingertip;

DESCRIPTION OF THE PREFERRED EMBODIMENTS

A coordinate input apparatus according to an embodiment of the present disclosure will be described hereinbelow.

Embodiment

Figure 1:
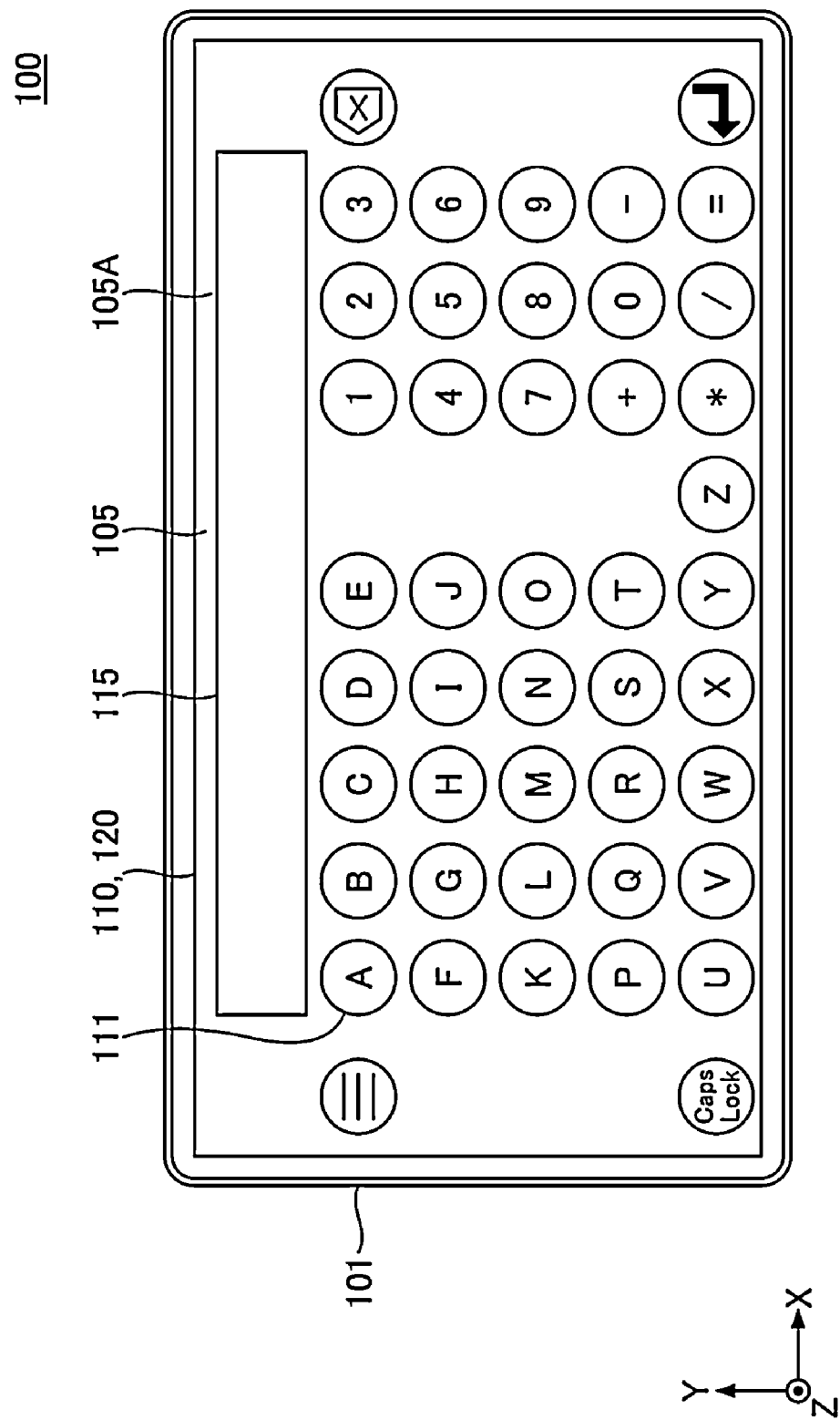
FIG. 1 is a diagram illustrating an example configuration of a coordinate input apparatus according to an embodiment.
Figure 2:
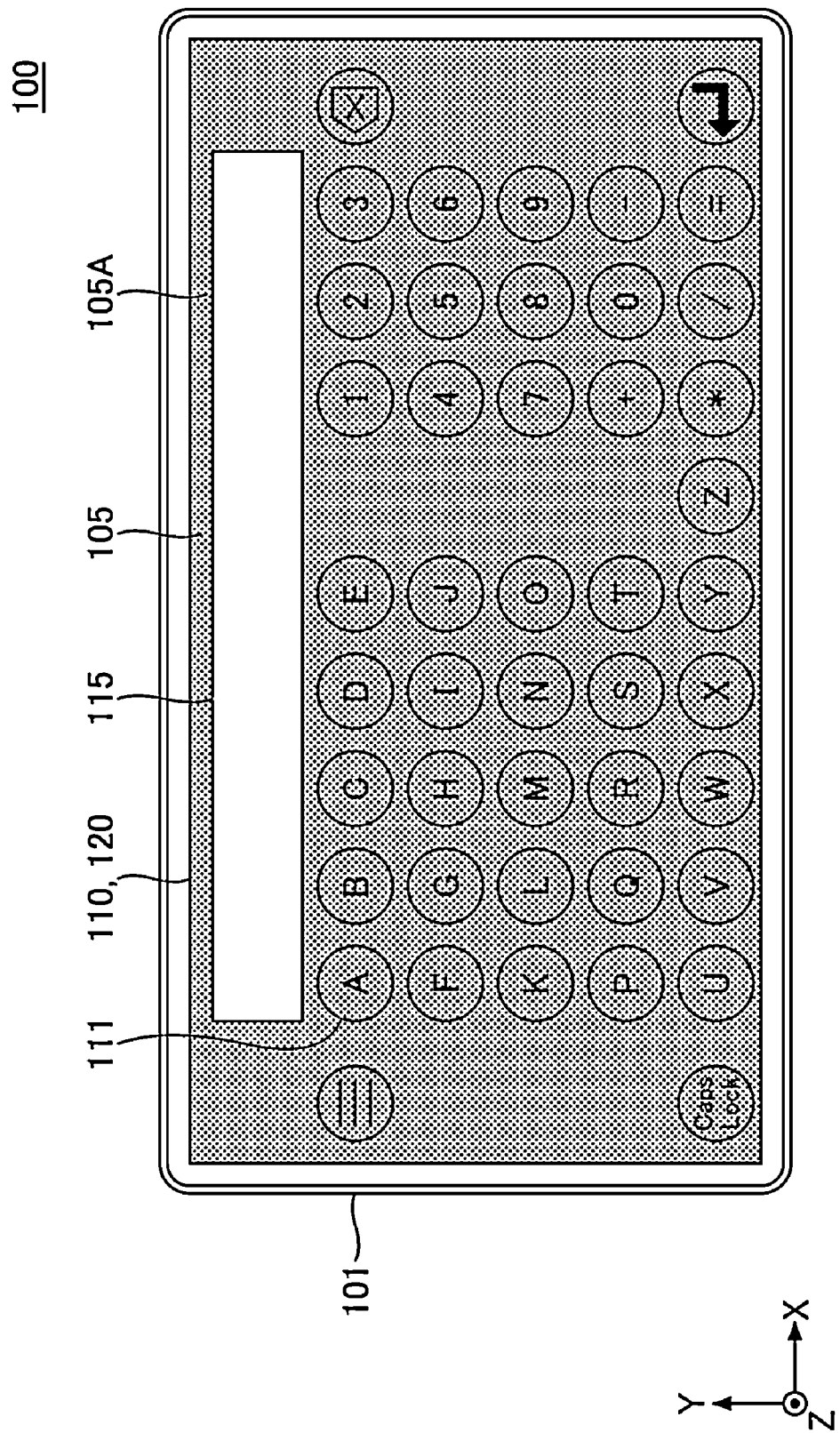
FIG. 2 is a diagram illustrating an example configuration of the coordinate input apparatus according to an embodiment.

FIGS. 1 and 2 are diagrams illustrating an example configuration of a coordinate input apparatus 100 according to an embodiment. FIG. 1 illustrates the coordinate input apparatus 100 in operation in which a display 110 is displaying an input image. When the display 110 is displaying an input image, the coordinate input apparatus 100 is in an input mode. The input mode is a mode in which the coordinate input apparatus 100 can accept a manipulated input. FIG. 2 illustrates the coordinate input apparatus 100 in a standby mode in which the display 110 is displaying a standby image. When the display 110 is displaying a standby image, the coordinate input apparatus 100 is in a power saving mode. In the standby mode, the display 110 appears gray overall and is in a low power consumption state. FIG.

3 is a diagram illustrating an example configuration of a capacitive sensor 120 and a control unit 130 of the coordinate input apparatus 100. The display 110 is an example of a display section. The capacitive sensor 120 is an example of a detector. The control unit 130 is an example of a controller.

The definition of the XYZ coordinate system will be described hereinbelow. The direction parallel to the X-axis (X direction), the direction parallel to the Y-axis (Y direction), and the direction parallel to the Z-axis (Z direction) cross at right angle. The −Z direction is a direction close to the capacitive sensor 120, and the +Z direction is a direction away from the capacitive sensor 120. The plan view is a view in X-Y plane. The length, the width, the thickness, and the like may be expressed in an exaggerated form for each of understanding of the configuration.

Examples of the coordinate input apparatus 100 include a tablet input device and the input unit of an automatic teller machine (ATM) which are placed in stores or facilities for use by general public users. Another example is the input unit of a cooking electrical appliance which needs to be kept clean. Still other examples of the coordinate input apparatus 100 include a tablet computer, a smartphone, and a game machine that are privately used.

<Overall Configuration of Coordinate Input Apparatus 100>

The coordinate input apparatus 100 includes a casing 101, a top panel 105, the display 110, the capacitive sensor 120, and the control unit 130. In one example, the control unit 130 (see FIG. 3, not shown in FIGS. 1 and 2) is disposed below the display 110 and the capacitive sensor 120 in the casing 101. The coordinate input apparatus 100 includes the capacitive sensor 120 and the control unit 130 shown in FIG. 3.

<Casing 101 and Top Panel 105>

The casing 101 is a case made of resin, metal, etc. that houses the display 110, the capacitive sensor 120, and the control unit 130. The display 110 is disposed below the transparent capacitive sensor 120, in an example, and can be visually recognized via an operating surface 105A, which is the upper surface of the transparent top panel 105 provided at an opening at the top of the casing 101.

<Types of Operation Method of Coordinate Input Apparatus 100>

The coordinate input apparatus 100 can be operated in both of a state in which a pointer, such as a user's hand, is not in contact with the operating surface 105A and a state in which the pointer is in contact with the operating surface 105A.

There are four types of operation method of the coordinate input apparatus 100: a proximate operation, a selection operation, a finalizing operation, and a contact operation. Among the four operation methods, the proximate operation, the selection operation, and the finalizing operation are operations performed by a pointer, such as a user's hand, without contact with the operating surface 105A. The contact operation is an operation performed by a pointer, such as a user's hand, in contact with the operating surface 105A.

The coordinate input apparatus 100 determines five states of distance between a pointer, such as a user's hand, and the operating surface 105A to distinguish the four operation methods. The five distance states include a non-detected state, a proximate state, a selection state, a finalizing condition, and a contact state. The five distance states include a contact state indicating that the operating surface 105A and a pointer, such as a hand, are in contact and a plurality of non-contact states indicating that the operating surface 105A and a pointer, such as a hand, are not in contact. The non-detected state, the proximate state, the selection state, and the finalizing condition are each a non-contact state.

The non-detected state is a state in which the proximate operation, the selection operation, the finalizing operation, and the contact operation are not performed. The proximate state, the selection state, the finalizing condition, and the contact state are states in which the proximate operation, the selection operation, the finalizing operation, and the contact operation are performed, respectively. The coordinate input apparatus 100 uses a plurality of thresholds of capacitance in distinguishing the operations. The position of a pointer, such as a hand, comes away from the operating surface 105A in order of the contact state, the finalizing condition, the selection state, the proximate state, and the non-detected state.

The coordinate input apparatus 100 is an input apparatus operated by the user performing a pointing operation. The pointing operation is an operation performed by standing a finger substantially perpendicular to the operating surface 105A. The number of fingers for use in the pointing operation may be plural but is preferably one.

If the finger is not substantially perpendicular to the operating surface 105A in the pointing operation, the entire palm comes close to the operating surface 105A, which significantly changes the value of the capacitance detected by the coordinate input apparatus 100. For this reason, the coordinate input apparatus 100 determines whether the pointing operation is performed correctly. The coordinate input apparatus 100 determines whether the user's operation is a pointing operation or a non-pointing operation from the capacitance distribution. If it is a non-pointing operation, calculation of the position of a fingertip FT may be omitted, and a warning of a non-pointing operation may be displayed. Alternatively, after the position of the fingertip FT is calculated, a warning of the non-pointing operation may be displayed.

An operation with a user's hand H, which is an example of the pointer, will be described hereinbelow. A proximate operation, a selection operation, a finalizing operation, or a contact operation with the hand His hereinafter simply referred to as an operation with a hand H.

The proximate operation is an operation to bring the hand H close to the operating surface 105A of the coordinate input apparatus 100 without touching the operating surface 105A and to switch the coordinate input apparatus 100 from the standby mode shown in FIG. 2 to the operation mode shown in FIG. 1.

The selection operation is an operation to further bring the hand H close to the operating surface 105A of the coordinate input apparatus 100 from the state of the proximate operation without touching the operating surface 105A to select a graphic user interface (GUI) button displayed on the display 110.

The finalizing operation is an operation to further bring the hand H close to the operating surface 105A of the coordinate input apparatus 100 from the state of the selection operation without touching the operating surface 105A to finalize the manipulated input on the selected GUI button. The finalizing operation is an operation to perform a manipulated input without contact, that is, an operation on the coordinate input apparatus 100 without touching the operating surface 105A with the hand H. The manipulated input by a non-contact selection operation and finalizing operation may be referred to as a hover input or a touchless input.

The contact operation is an operation to finalize the manipulated input on the selected GUI button by further bringing the hand H from the state of the selection operation close to the operating surface 105A of the coordinate input apparatus 100 to touch the operating surface 105A. The contact operation may also be referred to as a touch input.
<Display 110>

Examples of the display 110 include a liquid crystal display and an organic electroluminescence (EL) display. The display 110 provides a graphic user interface (GUI). The display 110 displays an image of the GUI buttons 111, a cursor, and an image of an entry display section 115 that displays an entry. The GUI buttons 111 are examples of an operating portion and are disposed in a matrix in plan view, by way of example. One example of the GUI buttons 111 is circular resembling a pushbutton.

Figure 3:
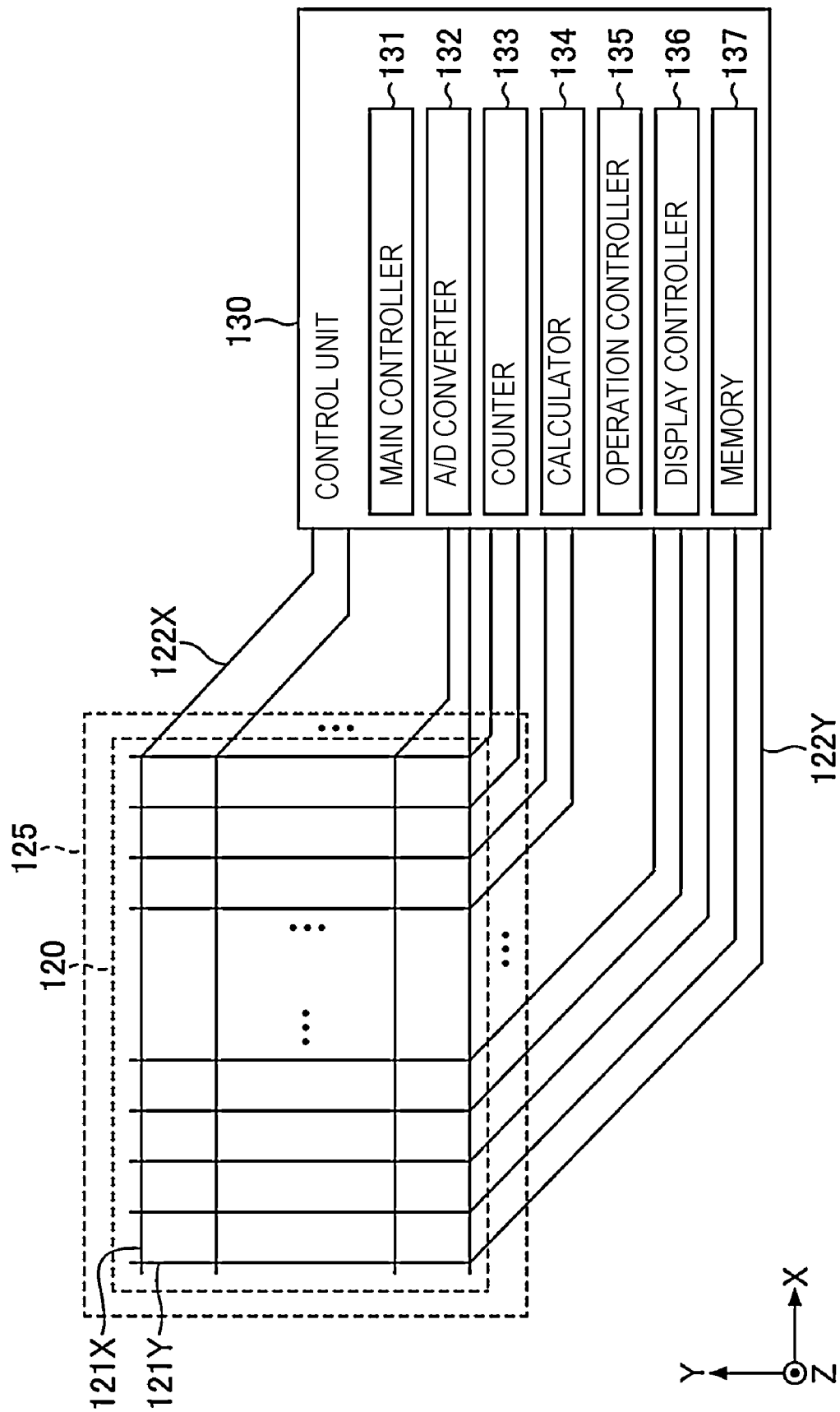
FIG. 3 is a diagram illustrating an example configuration of a capacitive sensor and a control unit of the coordinate input apparatus according to an embodiment.

FIGS. 1 to 3 illustrate 26 alphabetical GUI buttons 111, 15 numerical keypad GUI buttons 111 including numbers, and four GUI buttons 111: a menu key (a three-line key at the upper left), a Caps Lock key (at the lower left), a backspace key (at the upper right), and an enter key (at the lower right), 45 in total, by way of example. The 45 GUI buttons 111 are arranged in 5 rows in the Y direction and 11 rows in the X direction. The rows extend in the X direction, and the columns extend in the Y direction. The GUI buttons 111 are not limited to the alphabets and the numbers for a numerical keypad but may be the characters of another language or symbols.

In this embodiment, a total of 45 GUI buttons 111 are displayed on the display 110. Alternatively, the coordinate input apparatus 100 may include an operating portion in which alphabets, numbers, symbols, etc. are printed on the top panel 105, instead of all or some of the 45 GUI buttons 111. For example, a backlight may be provided on the back of the top panel 105, and the operating portion in which alphabets, numbers, symbols, etc. are printed is translucent. When the coordinate input apparatus 100 is in the standby mode, the backlight is turned off, and when the coordinate input apparatus 100 switches to the input mode, the backlight is turned on so that the alphabets, the numbers, the symbols, etc. on the operating portion of the top panel 105 are irradiated with light. In this case, a liquid crystal display, an organic EL display, or another display may be provided only in the entry display section 115 to display the entry.
<Capacitive Sensor 120>

The capacitive sensor 120 is disposed over the display 110 and includes a plurality of sensor electrodes 121X extending in the X direction and a plurality of sensor electrodes 121Y extending in the Y direction, as shown in FIG. 3. The sensor electrodes 121X and 121Y are examples of the electrodes of the detector and are connected to the control unit 130 via wiring lines 122X and 122Y, respectively. The sensor electrodes 121X and 121Y are formed on an insulating substrate 125. One example of the capacitive sensor 120 is a transparent conductive film of a material, such as indium tin oxide (ITO), on the surface of transparent glass with the sensor electrodes 121X and 121Y and the wiring lines 122X and 122Y patterned thereon. The capacitance detected by the capacitive sensor 120 is input to the control unit 130. The capacitance detected by the capacitive sensor 120 is an example of the detection result of the capacitive sensor 120.

FIG. 3 illustrates the plurality of sensor electrodes 121X and the plurality of sensor electrodes 121Y by way of example. The interval between the sensor electrodes 121X and the interval between the sensor electrodes 121Y is about the average width (about 10 mm) of human fingertips and substantially equal to the interval between the GUI buttons 111.

The plurality of sensor electrodes 121X are scanned row by row, and the plurality of sensor electrodes 121Y are scanned column by column. An analog-to digital (A/D) converter 132 converts the capacitances at the multiple intersections of the plurality of sensor electrodes 121X and the plurality of sensor electrodes 121Y to digital values. A counter 133 counts changes in the output from the A/D converter 132 and outputs a difference value ΔAD at each intersection. Each intersection is one example of a detecting position. The GUI buttons 111 and sensor electrodes about the same size as the GUI buttons 111 may correspond to each other on a one-to-one basis.

The position of the hand H on the X-Y coordinate that the coordinate input apparatus 100 detects using the capacitive sensor 120 has the highest capacitance in the area in which the hand His present. The capacitance at the position of the hand H in the Z direction that the coordinate input apparatus 100 detects using the capacitive sensor 120 is inversely proportional to the capacitance detected by the capacitive sensor 120. For this reason, determining the position of the hand H in the Z direction is synonymous with determining the capacitance between the hand H and the capacitive sensor 120. In one example, the coordinate input apparatus 100 determines the position of the hand H in the Z direction from the capacitance between the hand H and the capacitive sensor 120. If it is easier to understand with the position of the hand H in the Z direction, the position of the hand H in the Z direction is used for description.
<Control Unit 130>

The control unit 130 is implemented by a computer including a central processing unit (CPU), a random access memory (RAM), a read only memory (ROM), an input/output interface, and an internal bus.

The control unit 130 includes a main controller 131, the A/D converter 132, the counter 133, a calculator 134, an operation controller 135, a display controller 136, and a memory 137. The A/D converter 132 and the counter 133 are examples of a measuring circuit. The calculator 134 is an example of a calculating circuit. The main controller 131, the A/D converter 132, the counter 133, the calculator 134, the operation controller 135, and the display controller 136 represent the functions of the program executed by the control unit 130 as functional blocks. The memory 137 functionally represents the memory of the control unit 130.

The main controller 131 is a processor that manages the processes of the control unit 130 as a whole and executes processes other than the processes executed by the A/D converter 132, the counter 133, the calculator 134, the operation controller 135, and the display controller 136. For example, the main controller 131 scans the plurality of sensor electrodes 121X and the plurality of sensor electrodes 121Y.

The A/D converter 132 converts the output of the capacitive sensor 120 to digital values. The output of the A/D converter 132 represents the capacitance detection values at the intersections of the sensor electrodes 121X and 121Y of the capacitive sensor 120. The counter 133 counts difference values with respect to the reference value of the output of the A/D converter 132 and output the difference values. The difference values are count values of changes from the reference value of the output. Each difference value is hereinafter referred to as a difference value ΔAD. The reference value is a capacitance at each of the intersections of the sensor electrodes 121X and 121Y in the case where no finger is present around the sensor electrodes 121X and 121Y. The difference value ΔAD is the capacitance between the intersection of the sensor electrodes 121X and 121Y and a finger.

The difference value ΔAD is obtained for each intersection. The A/D converter 132 converts the capacitance of each intersection of the sensor electrodes 121X and 121Y to a digital value. The counter 133 counts changes in the output of the A/D converter 132 from the reference value and outputs the difference value ΔAD for each intersection.

The calculator 134 determines the position of the hand H in the X-Y coordinate and the position of the hand H in the Z direction from the operating surface 105A based on the difference value ΔAD output from the counter 133. The difference value ΔAD output from the counter 133 is an example of the capacitances at the intersections of the sensor electrodes 121X and 121Y of the capacitive sensor 120. The measured value of the capacitance is the difference value ΔAD.

The calculator 134 determines the distance state between the hand H and the operating surface 105A using a plurality of thresholds for distinguishing the non-detected state, the proximate operation, the selection operation, the finalizing operation, and the contact operation. The number of the plurality of thresholds is eight because the thresholds include an on threshold and an off threshold to provide hysteresis characteristics in distinguishing the non-detected state, the proximate operation, the selection operation, the finalizing operation, and the contact operation. The distance states between the hand H and the operating surface 105A includes the non-detected state, the proximate state, the selection state, the finalizing condition, and the contact state, as described above. The calculator 134 determines the positions of the hand H in the individual states and outputs data indicating the position of the hand H detected to the operation controller 135.

The calculator 134 does not correct the measured values of the capacitances when the proximate operation, the selection operation, and the finalizing operation are being performed. This is because the measured values of the capacitances when the proximate operation, the selection operation, and the finalizing operation are being performed are substantially proportional to the area of the finger because of the reason described later.

The calculator 134 corrects the measured values of the capacitance when the contact operation is being performed. This is because the measured values of the capacitances when the contact operation is being performed are not proportional to the area of the finger because of the reason described later. This correction performed by the calculator 134 improves the accuracy of detection of the position of the hand H when the contact operation is being performed.

The operation controller 135 controls the operation of the coordinate input apparatus 100 based on the position of the hand H determined by the calculator 134. The display controller 136 controls the display of the display 110 based on the position of the hand H detected by the calculator 134. The memory 137 stores programs and data used when the main controller 131, the calculator 134, the operation controller 135, and the display controller 136 execute processes.

<Operation on Operating Surface 105A>

Figure 4:
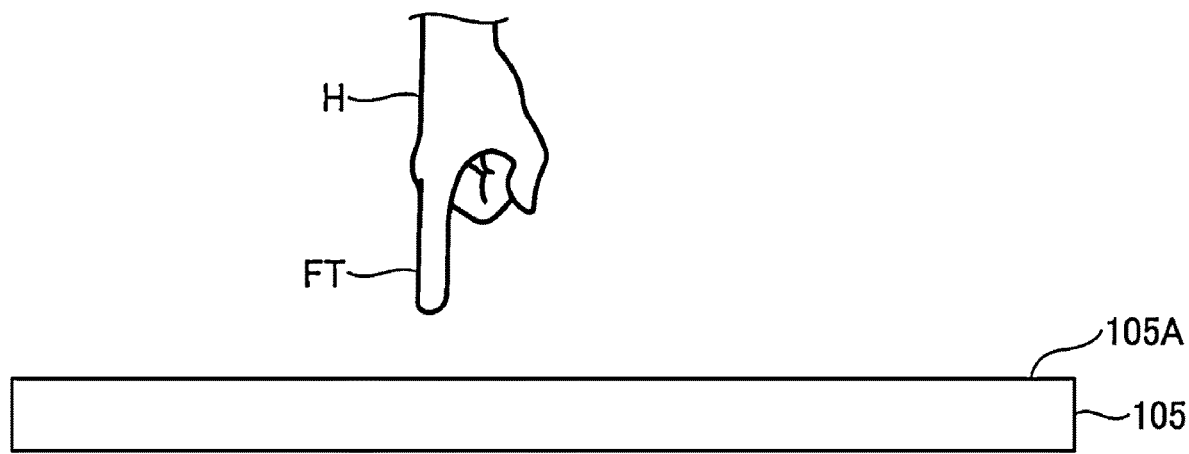
FIG. 4 is a diagram illustrating an example of a state in which an operation with a fingertip of a hand is performed on the operating surface of the coordinate input apparatus according to an embodiment.

FIG. 4 is a diagram illustrating an example of a state in which an operation with the fingertip FT of the hand H is performed on the operating surface 105A of the coordinate input apparatus 100. FIG. 4 illustrates a state in which the fingertip FT of the hand H is brought close perpendicularly to the operating surface 105A of the top panel 105 to perform a pointing operation. Thus, it is preferable to perform the operation to bring the fingertip FT close perpendicularly to the operating surface 105A of the top panel 105.

Using the plurality of thresholds described above allows the coordinate input apparatus 100 to distinguish the proximate operation, the selection operation, the finalizing operation, and the contact operation. The fingertip FT comes close to the operating surface 105A in order of the proximate operation, the selection operation, the finalizing operation, and the contact operation. For this reason, increasing the threshold in order of the proximate operation to the contact operation allows distinguishing the proximate operation, the selection operation, the finalizing operation, and the contact operation. A method for improving the accuracy of position detection of the hand H using a curve approximation method will be described.

<Calculating Position of Fingertip FT>

The coordinate input apparatus 100 calculates the position of the fingertip FT using, among three or more measured values including the maximum value of the plurality of measured values obtained from the plurality of intersections of the sensor electrodes 121X and 121Y, the maximum value and measured values with the maximum value therebetween in either of the X direction and the Y direction. The position of the fingertip FT is a position of the fingertip FT in the two-axis direction of the operating surface 105A. The position of the fingertip FT calculated in this manner is represented as calculated coordinates.

More specifically, the position (calculated coordinates) of the fingertip FT can be calculated using the curve approximation method, by way of example. The curve approximation method is described in US2012/0319994, which is summarized as follows.

<Curve Approximation Method>

Figure 5:
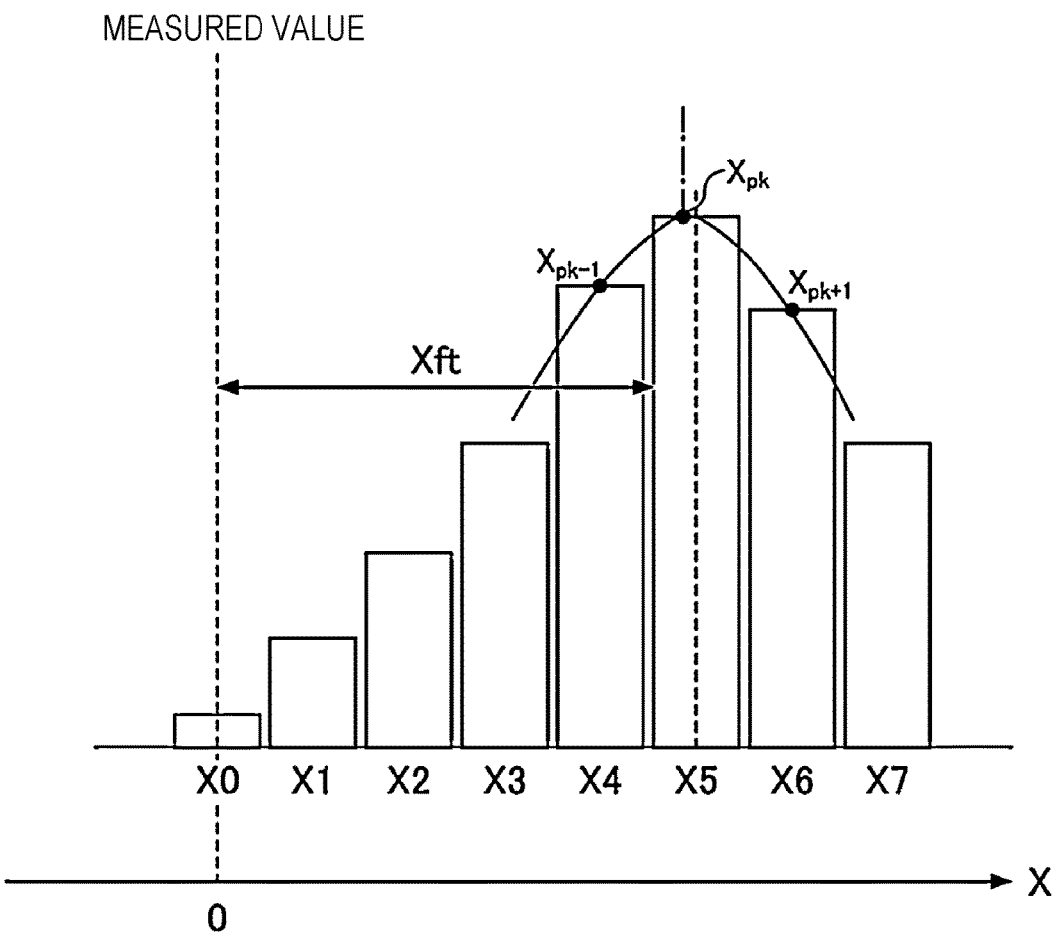
FIG. 5 is a graph illustrating an example of a curve approximation method.

FIG. 5 is a graph illustrating an example of the curve approximation method. FIG. 5 illustrates an example of measured values (difference values ΔAD) obtained at eight intersections arrayed in the X direction. The eight intersections are distinguished as X0 to X7, which are hereinafter referred to as intersections X0 to X7. The X-coordinate of the intersection X0 takes a value of 0. In FIG. 5, a first corrected measured value at the intersection X5 takes the maximum value (peak value).

The calculator 134 is configured to perform the curve approximation method using changes in measured values for the intersection X5 at which the maximum measured value is obtained and for intersections X4 and X6 next to the intersection X5.

For example, the calculator 134 calculates the X-coordinate $X_{ft}$ of the position (calculated coordinates) of the fingertip FT by a quadratic approximation method using Eq. (1) based on three measured values at the intersection X5 and the two intersections X4 and X6 next to the intersection X5 in the X direction.

$$Xft = \frac{C_{pk-1} - C_{pk+1}}{(C_{pk-1} + C_{pk+1} - 2 \times C_{pk}) \times 2} \times RES \times X\max \qquad (1)$$

where $C_{pk}$ is the measured value at an intersection $(X_{pk}, Y_{pk})$ at which the maximum measured value is obtained, $C_{pk-1}$ is the measured value at an intersection $(X_{pk-1}, Y_{pk})$ next to the intersection $(X_{pk}, Y_{pk})$ on the −X direction side, and $C_{pk+1}$ is the measured value at an intersection $(X_{pk+1}, Y_{pk})$ next to the intersection $(X_{pk}, Y_{pk})$ on the +X direction side, RES is the resolution, which is the interval between the sensor electrodes 121X and 121Y with respect to unit coordinates, and Xmax is the X-coordinate of an intersection at which a maximum value Cmax of the measured values (difference values ΔAD) is obtained.

Performing the same process for a plurality of intersections arrayed in the Y direction allows calculating the Y-coordinate $Y_{ft}$ of the position (calculated coordinates) of the fingertip FT. The position of the fingertip FT is represented by the X-Y coordinate (Xft, Yft).

<Reference Positions R1 and R2>

Figure 6:
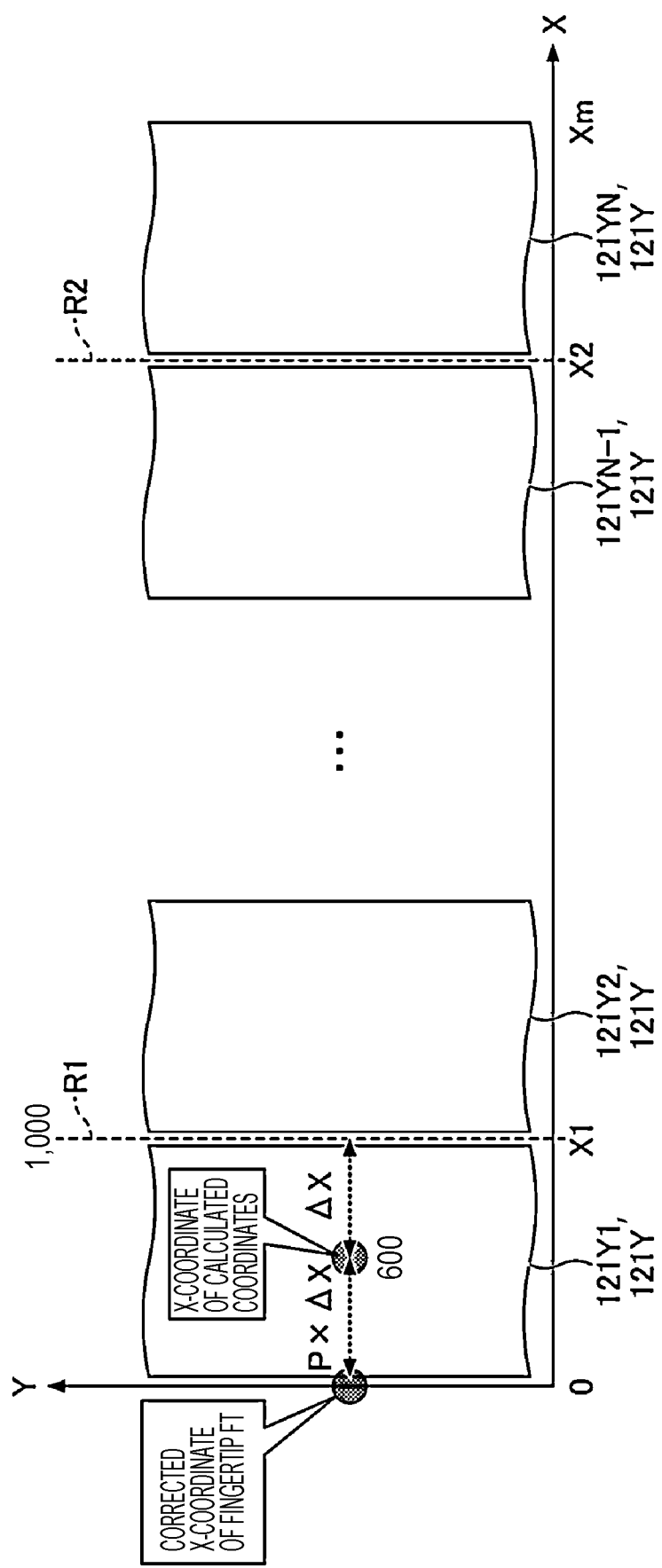
FIG. 6 is a diagram illustrating an example of the array of a plurality of sensor electrodes in the X direction.

FIG. 6 is a diagram illustrating an example of the array of the plurality of sensor electrodes 121Y in the X direction. In FIG. 6, the sensor electrodes 121X are omitted. FIG. 6 illustrates intermediate portions of N sensor electrodes 121Y in the Y direction overlapping with one sensor electrode 121X extending in the X direction. N is an integer greater than or equal to 2, for example, between 50 and 200.

Since the sensor electrodes 121Y overlap with the sensor electrode 121X, the sensor electrodes 121X and 121Y have N intersections in the X direction. In FIG. 6, the origin (a point at which the X-coordinate is 0) of the X-axis coincides with the edge on the −x direction side of a sensor electrodes 121Y located closest to the −X direction side.

In FIG. 6, the N sensor electrodes 121Y are distinguished, like sensor electrodes 121Y1, 121Y2, . . . , 121YN−1, and 121YN (121Y1 to 121YN), from the −X direction side to the +X direction side. The sensor electrode 121Y1 to 121YN, if no particular distinction is made, are simply referred to as a sensor electrode 121Y. The sensor electrode 121Y1 is an example of a first sensor electrode, and in this case the sensor electrode 121Y2 is an example of a second sensor electrode. The sensor electrode 121YN is an example of the first sensor electrode, and in this case, the sensor electrode 121YN−1 is an example of the second sensor electrode.

Since the intersections of the sensor electrodes 121X and 121Y are examples of detecting positions, the intersection of the sensor electrode 121Y1 and the sensor electrode 121X in FIG. 6 is an example of the detecting position at an extreme end in the X direction. The intersection of the sensor electrode 121YN and the sensor electrode 121X in FIG. 6 is an example of the detecting position at an extreme end in the X direction. The extreme end means the farthest end, which is synonymous with the utmost end.

In the coordinate input apparatus 100, for the X direction, the region between the edge on the −X direction side of the sensor electrode 121Y1 at the extreme end on the −X direction side and the edge on the +X direction side of the sensor electrode 121YN at the extreme end on the +X direction side is a region in which the position of the fingertip FT can be detected. In other words, for the X direction, the region in which the position of the fingertip FT can be detected is located inside the edge on the −X direction side (the outer side in the X direction) of the sensor electrode 121Y1 at the extreme end on the −X direction side and located on the inner side of the capacitive sensor 120 in plan view than the edge on the +X direction (the outer side in the X direction) of the sensor electrode 121YN at the extreme end on the +X direction side.

The coordinate input apparatus 100 has a reference position R1 between the sensor electrode 121Y1 corresponding to an intersection at an extreme end on the −X direction side and the sensor electrode 121Y2 next to the sensor electrode 121Y1 in the X direction. The coordinate input apparatus 100 further has a reference position R2 between the sensor electrode 121YN corresponding to an intersection at the extreme end on the +X direction side and the sensor electrode 121YN−1 next to the sensor electrode 121YN in the X direction. FIG. 6 illustrates the positions of the reference positions R1 and R2 in dashed lines. The X-coordinates of the reference positions R1 and R2 are represented by X1 and X2, respectively.

The coordinate input apparatus 100 applies a quadratic curve to the measured values at three points (three intersections) using a curve approximation method to determine the X-coordinate of the vertex of the applied quadratic curve as the X-coordinate of the fingertip FT. In this case, if the X-coordinate of the fingertip FT determined is within the range from the reference position R1 to the reference position R2, the coordinate input apparatus 100 outputs the X-coordinate of the fingertip FT without correcting the X-coordinate.

If the X-coordinate of the fingertip FT determined is on the −X direction side of the reference position R1 or on the +X direction side of the reference position R2, the coordinate input apparatus 100 corrects the X-coordinate of the fingertip FT determined and outputs the corrected X-coordinate.

Although FIG. 6 illustrates the reference positions R1 and R2 at the opposite ends in the X direction, the coordinate input apparatus 100 further has reference positions at the opposite ends in the Y direction. If the Y-coordinate of the fingertip FT determined is within the range from the reference position on the −Y direction side to the reference position on the +Y direction side, the coordinate input apparatus 100 outputs the Y-coordinate of the fingertip FT without correcting the Y-coordinate. If the Y-coordinate of the fingertip FT determined is on the −Y direction side of the reference position on the −Y direction side or on the +Y direction side of the reference position on the +Y direction side, the coordinate input apparatus 100 corrects the Y-coordinate of the fingertip FT determined and outputs the corrected Y-coordinate.

<Deviation in Position of Vertex of Quadratic Curve Obtained Using Curve Approximation Method>

FIG. 7 is a graph illustrating an example of deviation in the position of the vertex of the quadratic curve determined using a curve approximation method. FIG. 7 illustrates the intersection CP1 of the sensor electrode 121Y1 and the sensor electrodes 121X in FIG. 6 and the intersection CP2 of the sensor electrode 121Y2 and the sensor electrodes 121X in FIG. 6. In one example, the X-coordinates of the intersections CP1 and CP2 take 500 and 1,500, respectively. The X-coordinate of each intersection is the coordinate of the center of the intersection in the X direction at which the sensor electrodes 121X and 121Y overlap in plan view. The interval between the intersections in the X direction correspond to an X-coordinate of 1,000.

Since the X-coordinate of the position of the sensor electrode 121Y1 on the −X direction side corresponding to the intersection CP1 takes a value of 0, the +X direction side of the position of the X-coordinate 0 is inside the capacitive sensor 120 in plan view, and the −X direction side of the position of the X-coordinate 0 is outside the capacitive sensor 120 in plan view.

In applying a quadratic curve to the measured values at three intersections next to each other in the X direction using the curve approximation method, the X-coordinates of the three intersections and the measured values at the three intersections are used.

In one example, in applying a quadratic curve to the measured values at three points (three intersections), assume that the fingertip FT comes close to the operating surface 105A and that the center of the X-coordinate of the fingertip FT is X=0. In this case, assume that the maximum value of the measured values (difference values ΔAD) of all the intersections is obtained at the intersection CP1.

In such a case, there is no intersection on the −X direction side of the intersection CP1. For this reason, the coordinate input apparatus 100 performs curve approximation on the assumption that a virtual intersection is present on the −X direction side of the intersection CP1, in addition to the intersection CP1 and the intersection CP2.

The virtual intersection is located on the −X direction side of the intersection CP1 by a distance equal to the interval between the intersections CP1 and CP2. The X-coordinate of the virtual intersection therefore takes a value of −500. The coordinate input apparatus 100 applies the quadratic curve to the three measured values: the virtual intersection, the intersection CP1, and the intersection CP2, regarding the measured value at the virtual intersection as zero.

In such a case, as shown in FIG. 7, the relationship among the three measured values, for example, the measured value at the virtual intersection takes zero, the measured value at the intersection CP1 takes 100, and the measured value at the intersection CP2 is 90, may occur. When a quadratic curve is applied to the three measured values, the quadratic curve indicated by the dashed line is obtained. The vertex (calculated coordinate) of the dashed quadratic curve is shifted to the inside of the capacitive sensor 120 in plan view from the actual coordinate (X=0) of the fingertip FT, and the X-coordinate thereof takes about 900.

This shift of the calculated coordinate of the fingertip FT is caused by the fact that the maximum measured value is measured at the intersection CP1 at the extreme end of the capacitive sensor 120 in the X direction. In other words, the vertex of the quadratic curve is shifted to the +X direction side because no intersection is present on the −X direction side of the intersection CP1, and for this reason, curve approximation is made assuming that a virtual intersection is present on the −X direction of the intersection CP1 and that the measured value at the virtual intersection takes a value of 0.

The same applies to a case in which the maximum value of the measured values is obtained at the intersection at the extreme end on the +X direction side. In this case, the vertex (calculated coordinate) of the quadratic curve obtained by curve approximation is shifted to the inner side (−X direction side) of the capacitive sensor 120 in plan view from the actual position of the fingertip FT. For the Y direction as well, the calculated coordinate of the fingertip FT is shifted.

The coordinate input apparatus 100 reduces or eliminates deviation in the calculated coordinates of the fingertip FT by correcting the calculated coordinates of the fingertip FT using the reference positions R1 and R2.

<Correction Factor>

Figure 8B:
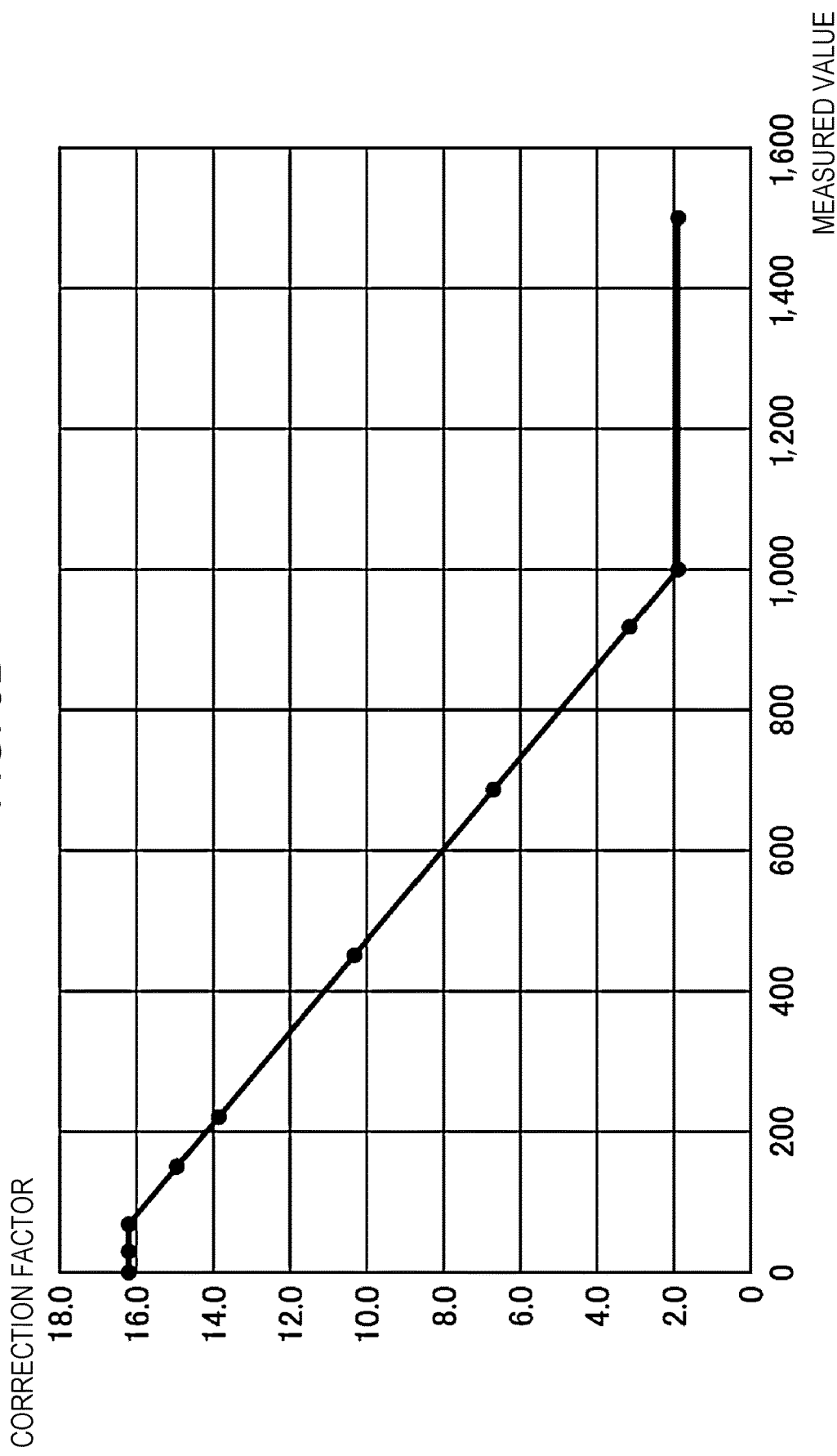
FIG. 8B is a diagram showing correction factors for use in correcting the calculated coordinates of the fingertip.

FIGS. 8A and 8B are diagrams illustrating examples of a correction factor in correcting the calculated coordinates of the fingertip FT. FIG. 8A shows the correction factors in tabular form. FIG. 8B shows the correction factors in graph form.

In one example, the correction factors are associated with the measured values. In FIG. 8A, for measured values from 0 to 79, the correction factor is set to a constant value of 16.2. In FIG. 8A, for measured values of 0, 40, and 79, the correction factor is set to 16.2.

For measured values from 80 to 1,000, the correction factor decreases gradually. Specifically, for measured values of 80, 160, 230, 460, 690, 920, and 1,000, the correction factor is set to 16.2, 15.0, 13.9, 10.3, 6.7, 3.1, and 1.9, respectively. For measured values from 1,000 to 1,500, the correction factor is set to a constant value of 1.9. In FIG. 8A, for measured values of 1,000, 1,001, and 1,500, the correction factor is set to 1.9.

In other words, for measured values of 80 or less, the correction factor is set to a constant value (16.2), for measured values from 80 to 1,000, the correction factor decreases gradually, and for measured values of 1,000 or more, the correction factor is set to a constant value (1.9).

This relationship between the measured values and the correction factors is shown in the graph of FIG. 8B.

In one example, a measured value of 80 is a threshold (selection-on threshold) for determining whether a selection operation has been performed (started). When the selection operation is started, it is determined in the coordinate input apparatus 100 that the selection operation is turned on. A predetermined value (for example, 75) less than 80 is a selection-off threshold for determining whether the selection operation is turned off. A predetermined value (for example, 500) greater than the selection-on threshold is a finalization-on threshold for determining whether the finalizing operation is turned on. A predetermined value (for example, 300) less than the finalization-on threshold is a finalization-off threshold for determining whether the finalizing operation is turned off. The greatest threshold is a contact threshold (contact-on threshold), and a predetermined value (for example, 700) less than the contact threshold (contact-on threshold) is a contact-off threshold.

When the fingertip FT comes close to the operating surface 105A, and the maximum value of the plurality of measured values detected at a plurality of detecting positions reaches 80, the coordinate input apparatus 100 determines that the selection operation is being performed. In a state in which the fingertip FT is farther from the operating surface 105A than in the selection operation, the measured value is less than 80. For this reason, in the non-detected state and the proximate state, the correction factor shown in FIGS. 8A and 8B is set to 16.2.

In one example, a measured value of 1,000 is a threshold (contact threshold) for determining whether a contact operation has been performed. When the fingertip FT comes into contact with the operating surface 105A, and the maximum value of the plurality of measured values detected at the plurality of detecting positions reaches 1,000, the coordinate input apparatus 100 determines that the contact operation is being performed. When the fingertip FT comes away from the operating surface 105A, and the maximum value of the plurality of measured values detected at the plurality of detecting positions falls below the contact-off threshold (700), the coordinate input apparatus 100 determines that the contact operation is stopped. When the maximum value of the plurality of measured values detected at the plurality of detecting positions falls below the confirmation-off threshold (300), the coordinate input apparatus 100 determines that the finalizing operation is stopped.

The reason the measured value serving as a threshold in decreasing the correction factor with an increase in the measured value is set to 80 (selection-on threshold) in the relationship between the measured value and the correction factor is that, in the non-detected state and the proximate state, it is difficult for the coordinate input apparatus 100 to detect the position (calculated coordinates) of the fingertip FT because of low measured values, but in the selection state in which the selection operation is performed, the coordinate input apparatus 100 can detect the position (calculated coordinates) of the fingertip FT with some degree of high accuracy.

The correction factor is set constant for measured values greater than or equal to a contact threshold of 1,000. This is because, even if the pressing force of the fingertip FT against the operating surface 105A increases during the contact operation to increase the measured value, the position of the fingertip FT does not change.

The correction of the calculated coordinates of the fingertip FT using the correction factor is performed when the maximum value of the measured values is obtained at the endmost intersection of the capacitive sensor 120 as described with reference to FIG. 7. The measured value increases in order of the proximate operation, the selection operation, finalizing operation, and the contact operation from a state in which no operation is performed on the operating surface 105A.

The measured value at the intersection directly under the fingertip FT takes the maximum value of the measured values at all the intersections. The measured values at the intersections next to the intersection at which the maximum measured value is obtained is relatively close to the maximum measured value when the fingertip FT is some distance away from the operating surface 105A as in the selection operation, compared to when the fingertip FT is close to the operating surface 105A as in the contact operation. This is because, when the fingertip FT is close to the operating surface 105A as in the contact operation, the capacitance between the fingertip FT and the intersection directly under the fingertip FT is significantly larger than the capacitances between the fingertip FT and the intersections next to the intersection directly under the fingertip FT, and in contrast, when the fingertip FT is some distance away from the operating surface 105A as in the selection operation, the capacitance between the fingertip FT and the intersection directly below the fingertip FT is not so different from the capacitance between the fingertip FT and the intersection next to the intersection directly below the fingertip FT.

In other words, the measured value at the intersection CP2 and the maximum measured value obtained at the intersection CP1 are relatively close in the selection operation rather than in the contact operation. From this, it can be said that the calculated coordinates of the fingertip FT can be corrected with higher accuracy by increasing the amount of correction of the calculated coordinates of the fingertip FT when the fingertip FT is away from the operating surface 105A as in the selection operation, compared to when the fingertip FT is close to the operating surface 105A as in the contact operation.

For this reason, the correction factor is decreased as the maximum measured value increases, by way of example. In other words, the correction factor is increased as the maximum measured value decreases.

<Correcting Calculated Coordinates Using Correction Factor>

This section is illustrated with reference to FIG. 6. In FIG. 6, the X-coordinate of the reference position R1 is assumed to be 1,000. Assume that the X-coordinate of the calculated coordinate takes a value of 600, as shown in FIG. 6. In other words, the X-coordinate of the calculated coordinates of the fingertip FT is located in the X directional width of the sensor electrode 121Y1.

In this case, the X-coordinate of the calculated coordinates is subtracted from the X-coordinate X1 of the reference position R1 to determine the difference ΔX in the X-coordinate. The difference ΔX is expressed by Eq. (2). When the calculated coordinate is within the width of the sensor electrodes 121YN, the X-coordinate X2 of the reference position R2 is substituted for X1 in Eq. (2).

$$\Delta X = X1 - Xc \qquad (2)$$

where Xc is the X-coordinate of the calculated coordinates of the fingertip FT.

The correction factor P is expressed by Eq. (3).

$$P = P\max - (P\max - P\min) \times (C\max - Csel)/(Ctouch - Csel) \qquad (3)$$

where Pmax is the maximum value of all the correction factors (see FIG. 8A), Pmin is the minimum value of all the correction factors (see FIG. 8A), Cmax is the maximum values of all the measured values, Csel is the selection-on threshold, and Ctouch is the contact threshold.

The correction factor, if less than a predetermined lower limit as a result of calculation according to Eq. (3), is limited to the predetermined lower limit. The correction factor, if higher than a predetermined upper limit as a result of calculation according to Eq. (3), is limited to the predetermined upper limit.

A correction amount S for correcting the calculated coordinates of the fingertip FT is expressed by Eq. (4) using the correction factor P and the difference ΔX.

$$S = P \times \Delta X \qquad (4)$$

The corrected X-coordinate XA of the fingertip FT can be determined by subtracting the correction amount S from the X-coordinate Xc of the calculated coordinates of the fingertip FT according to Eq. (5).

$$XA = Xc - S \qquad (5)$$

The lower limit and the upper limit are applied to the X-coordinate XA determined according to Eq. (5). This is for the purpose of, when the corrected X-coordinate is out of the region in which the position of the fingertip FT can be detected by the capacitive sensor 120, limiting the position of the fingertip FT within the detectable region. Specifically, the lower limit of the X-coordinate is zero (0), which is the coordinate of the −X directional edge of the sensor electrode 121Y1 at the extreme end in the −X direction, and the upper limit of the X-coordinate is Xm, which is the X-coordinate of the +X directional edge of the sensor electrode 121YN at the extreme end in the +X direction.

<Specific Example of Correction>

If the X-coordinate Xc of the calculated coordinates of the fingertip FT takes a value of 600, as shown in FIG. 6, the difference ΔX is expressed as ΔX=X1 (1,000)−Xc (600)= 400. If the maximum value Cmax of the measured values is 1,000, the correction factor P is expressed as P=Pmax (1,000)−((Pmax (1,000)−Pmin (80))×((Cmax (1,000)−Csel (80))/((Ctouch (1,000)−Csel (80))=1.9. In this case, the correction amount S is expressed as S=P (1.9)×ΔX (400)= 760. The corrected X-coordinate XA of the fingertip FT is expressed as XA=Xc (600)−S (760)=−160. The corrected X-coordinate XA of the fingertip FT, which is limited to 0 or more and less than or equal to Xm, is expressed as XA=0. As a result, the corrected X-coordinate of the fingertip FT is expressed as X=0, as shown in FIG. 6.

Although the X-coordinate of the calculated coordinates of the fingertip FT has been described above, the same applies to the Y-coordinate.

<Flowchart>

Figure 9A:
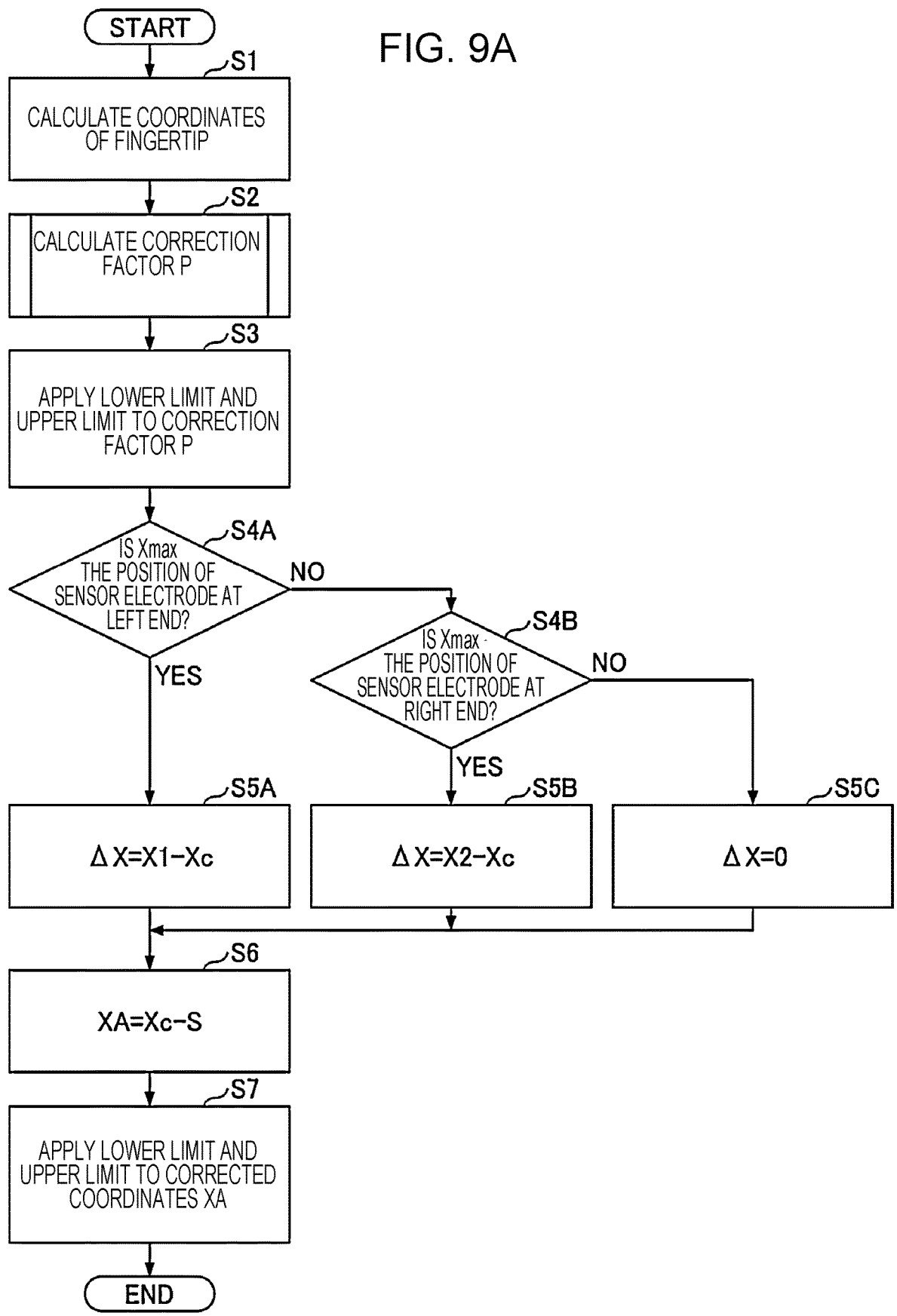
FIG. 9A is a flowchart illustrating an example of a process executed by a calculator of the coordinate input apparatus according to an embodiment.

FIG. 9A is a flowchart illustrating an example of a process executed by the calculator 134 of the coordinate input apparatus 100. Although this section illustrates a process for correcting the X-coordinate, the same applies to the Y-coordinate. In other words, the calculator 134 may perform a correcting process for the Y-coordinate, in addition to the process for the X-coordinate.

The calculator 134 calculates the X-coordinate of the fingertip FT using a curve approximation method (step S1).

The calculator 134 calculates the correction factor P according to Eq. (3) (step S2).

The calculator 134 applies the lower limit and the upper limit to the correction factor P calculated in step S3 (step S3).

The calculator 134 determines whether the X-coordinate Xmax at which the maximum value Cmax of the measured values is obtained is of the position of the sensor electrode 121X at the left end (step S4A).

If the calculator 134 determines that the X-coordinate Xmax is of the position of the sensor electrode 121X at the left end (S4A: Yes), then the calculator 134 subtracts the X-coordinate Xc of the calculated coordinates from the X-coordinate X1 of the reference position R1 to obtain the difference ΔX in X-coordinate (step S5A) according to Eq. (2)

The calculator 134 determines the corrected X-coordinate XA of the fingertip FT (step S6). More specifically, the calculator 134 determines the correction amount S according to Eq. (4) and then determines the X-coordinate XA according to Eq. (5) using the determined correction amount S.

The calculator 134 applies the lower limit and the upper limit to the X-coordinate XA determined in step S6 (step S7).

Thus, the series of processes come to an end. The calculator 134 repeatedly executes the process from START to END.

If the calculator 134 determines in step S4A that Xmax<X1 does not hold, (S4A: No), then the calculator 134 determines whether the X-coordinate Xmax at which the maximum value Cmax of the measured values is obtained is of the position of the sensor electrode 121X at the right end (step S4B).

If the calculator 134 determines that the X-coordinate Xmax is of the position of the sensor electrode 121X at the right end (S4B: Yes), then the calculator 134 subtracts the X-coordinate Xc of the calculated coordinates from the X-coordinate X2 of the reference position R2 to obtain the difference ΔX in the X-coordinate (step S5B) according to Eq. (2)

When the calculator 134 completes the process in step S5B, the calculator 134 determines the corrected X-coordinate XA of the fingertip FT (step S6). More specifically, the calculator 134 determines the correction amount S in accordance with Eq. (4) and then determines the X-coordinate XA in accordance with Eq. (5) using the determined correction amount S. Upon completing the process in step S6, the calculator 134 advances the procedure to step S7 and applies the lower limit and the upper limit to the determined X-coordinate XA. Upon completing the series of processes, the calculator 134 repeatedly executes the process from START to END.

If the calculator 134 determines in step S4B that X2<Xmax does not hold (S4B: No), then the calculator 134 sets the difference ΔX in X-coordinate to zero (0) (step S5C). In other words, ΔX=0 is satisfied. Upon completing the process in step S5C, the calculator 134 advances the procedure to step S6 and then to S7. Upon completing the series of processes, the calculator 134 repeatedly executes the process from START to END.

If the procedure advances to step S5C, the X-coordinate Xc is output without being corrected because the X-coordinate Xc of the calculated coordinates of the fingertip FT is within the range from the reference position R1 to the reference position R2 (X1≤Xc≤X2).

<Flowchart of Modification of Embodiment>

Figure 9B:
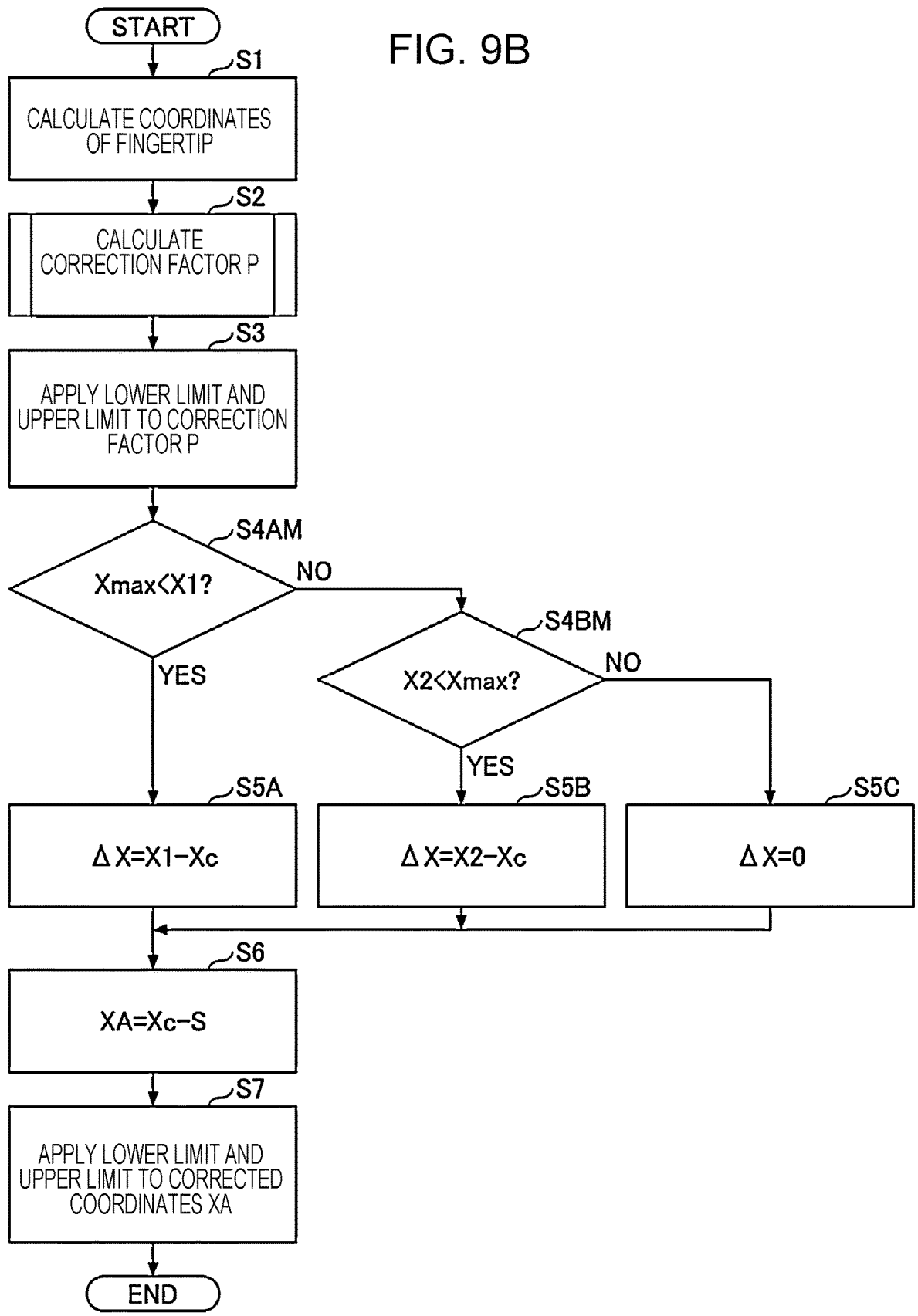
FIG. 9B is a flowchart illustrating an example of the process of a modification executed by the calculator of the coordinate input apparatus.

FIG. 9B is a flowchart illustrating an example of the process of a modification executed by the calculator 134 of the coordinate input apparatus 100. Although this section illustrates a process for correcting the X-coordinate, the same applies to the Y-coordinate. In other words, the calculator 134 may perform a correcting process for the Y-coordinate, in addition to the process for the X-coordinate.

The flowchart shown in FIG. 9B replaces steps S4A and S4B in FIG. 9A with steps S4AM and S4BM, respectively. In step S4AM of the modification in FIG. 9B, it is determined whether the X-coordinate Xc of the calculated coordinates of the fingertip FT is less than the X-coordinate X1 of the reference position R1 (step S4AM). If the X-coordinate Xmax at which the maximum value Cmax of the measured values is obtained corresponds to the electrode at the left end, Xc falls below the X-coordinate X1 of the reference position R1. Thus, the same result is given in step S4A in FIG. 9A and step S4AM in FIG. 9B.

In step S4BM of the modification in FIG. 9B, it is determined whether the X-coordinate Xc of the calculated coordinates of the fingertip FT exceeds the X-coordinate X2 of the reference position R2 (step S4BM). If the X-coordinate Xmax at which the maximum value Cmax of the measured values is obtained corresponds to the electrode at the right end, Xc exceeds the X-coordinate X2 of the reference position R2. Thus, the same result is obtained in step S4B of FIG. 9A and step S4BM of FIG. 9B.

Thus, it may be determined whether the X-coordinate Xmax at which the maximum value Cmax of the measured values is obtained is at an end by comparing the value of the X-coordinate Xc of the calculated coordinates of the fingertip FT with the threshold.

The coordinate input apparatus 100 includes the insulating substrate 125, the plurality of sensor electrodes 121X and 121Y having a plurality of detecting positions and provided on the insulating substrate 125, the top panel 105 including the operating surface 105A that allows an operation with the fingertip FT (a pointer), the top panel 105 covering the plurality of sensor electrodes 121X and 121Y, the A/D converter 132 and the counter 133 (a measuring circuit) configured to measure a capacitance of each of the plurality of detecting positions, and a calculator 134 configured to calculate a position of the fingertip FT (the pointer) in the X direction and the Y direction (two-axis directions) of the operating surface 105A based on a measured value of the capacitance of each of the plurality of detecting positions, wherein, at three points of a detecting position at which the maximum value Cmax, among the plurality of measured values measured at the plurality of detecting positions, is obtained and detecting positions next to the detecting position at which the maximum value Cmax is obtained in the X direction or the Y direction, the calculator 134 applies a quadratic curve to the maximum value Cmax and the measured values measured at the adjacent detecting positions to calculate a position of a vertex of the quadratic curve as a position of the fingertip FT (the pointer) in the X direction or the Y direction of the operating surface 105A, wherein, when the detecting position at which the maximum value Cmax is obtained is a detecting position, among the plurality of detecting positions, that is at an extreme end in the X direction or the Y direction, the calculator 134 corrects the position of the fingertip FT (the pointer), obtained as the position of the vertex of the applied quadratic curve, toward the extreme end in the X direction or the Y direction. This allows the calculated coordinate of the fingertip FT, if deviated to the inside of the region in which the position of the fingertip FT can be detected, to be corrected to the outside (to the extreme end).

This allows providing the coordinate input apparatus 100 with improved detection accuracy while using the curve approximation calculation method.

When the position of the vertex of the quadratic curve is closer to the extreme end than the reference position in the X direction or the Y direction, the calculator 134 may calculate a correction distance by multiplying a distance from the reference position to the vertex by a correction factor and may correct the position of the fingertip FT (the pointer) to a position shifted from the reference position toward the extreme end by the correction distance. This allows the position of the fingertip FT (the pointer) to be corrected with a small amount of calculation, providing the coordinate input apparatus 100 with improved detection accuracy while using the curve approximation method.

The calculator 134 may calculate the distance from the operating surface 105A to the fingertip FT (the pointer) based on the maximum value Cmax. The correction factor may be increased as the maximum value Cmax decreases. The required correction amount varies between when the fingertip FT is in contact with the operating surface 105A and when the fingertip FT is away from the operating surface 105A. For this reason, changing the correction amount depending on the distance between the fingertip FT and the operating surface 105A allows providing the coordinate input apparatus 100 with further improved detection accuracy.

When the maximum value Cmax is greater than or equal to a contact threshold for determining whether the fingertip FT (the pointer) is in contact with the operating surface 105A, the calculator 134 may determine that the fingertip FT (the pointer) is in contact with the operating surface 105A, and when the maximum value Cmax is greater than or equal to the contact threshold, the correction factor may be set to a constant value regardless of the maximum value Cmax. The maximum value Cmax of the measured values increases as the area of contact between the fingertip FT and the operating surface 105A increases. However, since the distance between the fingertip FT and the sensor electrodes 121X and 121Y does not change, an appropriate correction amount is not varied. For this reason, setting the correction factor to a constant value when the maximum value Cmax is greater than or equal to the contact threshold allows the position of the fingertip FT to be corrected more appropriately, providing the coordinate input apparatus 100 with further improved detection accuracy.

When the maximum value Cmax is less than the contact threshold, the calculator 134 may calculate the correction factor using Eq. (6), $$P = P\text{max} - (P\text{max} - P\text{min}) \times (C\text{max} - C\text{sel})/(C\text{touch} - C\text{sel}) \quad (6)$$

where Pmax is a maximum value Cmax of all correction factors P, Pmin is a minimum value of all the correction factors P, Cmax is a maximum value Cmax of all the measured values, Csel is a selection-on threshold, and Ctouch is the contact threshold.

By calculating the correction factor according to Eq. (6), the amount of correction of the calculated coordinates of the fingertip FT can be increased more when the fingertip FT is away from the operating surface 105A as in the selection operation, compared to when the fingertip FT is close to the operating surface 105A as in the contact operation.

The measured value at the intersection directly under the fingertip FT takes the maximum value of all the measured values. The measured values at the intersections next to the intersection at which the maximum measured value is obtained is relatively close to the maximum measured value when the fingertip FT is some distance away from the operating surface 105A as in the selection operation, compared to when the fingertip FT is close to the operating surface 105A as in the contact operation. This is because, when the fingertip FT is close to the operating surface 105A as in the contact operation, the capacitance between the fingertip FT and the intersection directly under the fingertip FT is significantly larger than the capacitances between the fingertip FT and the intersections next to the intersection directly under the fingertip FT, and in contrast, when the fingertip FT is some distance away from the operating surface 105A as in the selection operation, the capacitance between the fingertip FT and the intersection directly below the fingertip FT is not so different from the capacitances between the fingertip FT and the intersections next to the intersection directly below the fingertip FT. For this reason, setting the correction amount as described above allows an appropriate correction factor depending on the distance between the operating surface 105A and the fingertip FT to be calculated, providing the coordinate input apparatus 100 with higher detection accuracy.

In the X direction or the Y direction of the operating surface 105A, a region inside an outer edge of a first sensor electrode (121Y1 or 121YN in the X direction), among the plurality of sensor electrodes 121X and 121Y, located at the extreme end, is a region in which the calculator 134 is allowed to calculate the position of the fingertip FT (the pointer). The first sensor electrode may correspond to the detecting position at the extreme end. The reference position (R1 or R2 in the X direction) may be located between the first sensor electrode and a second sensor electrode (121Y2 or 121YN−1 in the X direction) next to the first sensor electrode in the X direction or the Y direction. Locating the first sensor electrode at the extreme end in the X direction or the Y direction and locating the reference position between the first sensor electrode and the second sensor electrode as described above provides the coordinate input apparatus 100 with further improved detection accuracy when the maximum measured value is obtained at the detecting position at the extreme end.

Having described a coordinate input apparatus according to an exemplary embodiment of the present disclosure, it is to be understood that the present disclosure is not limited to the specific embodiment and that various modifications and changes may be made without departing from the scope of the accompanying claims.

What is claimed is:

1. A coordinate input apparatus comprising:
an insulating substrate;
a capacitance sensor including a plurality of sensor electrodes provided on the insulating substrate, the plurality of electrodes having a plurality of detecting positions;
a top panel covering the plurality of sensor electrodes, the top panel including an operating surface that allows an operation with a pointer, the pointer changing a capacitance of the plurality of sensor electrodes depending on a distance to the operating surface;
a measuring circuit configured to measure the capacitance at each of the plurality of detecting positions, thereby providing a plurality of measured capacitance values; and
a calculating circuit configured to calculate a position of the pointer in two axis directions of the operating surface based on the plurality of measured capacitance values,
wherein the calculating circuit is further configured:
to determine, in each of the two axis directions, a maximum detecting position having a maximum capacitance value among the plurality of measured capacitance values and two adjacent detecting positions on respective sides of the maximum detecting position in the axis direction, and to fit a quadratic curve to the maximum capacitance value and the measured capacitance values of the two adjacent detecting positions, thereby calculating a position of a vertex of the quadratic curve as a position of the pointer in the axis direction, and if the maximum detecting position is an end detecting position closest to an edge of the capacitance sensor in the axis direction, to correct the position of the pointer by shifting the calculated position of the vertex toward the edge of the capacitance sensor in the axis-direction;
to calculate a distance from the operating surface to the pointer based on the maximum capacitance value; and
to set a reference position in a vicinity of the edge of the capacitance sensor in each of the two axis directions, and when the calculated position of the vertex is closer to the edge of the capacitance sensor than the reference position in the axis direction, to calculate a correction distance by multiplying a distance between the reference position and the vertex by a correction factor, thereby correcting the position of the pointer by shifting the calculated position of the vertex toward the edge of the capacitance sensor by the correction distance,
and wherein the correction factor is increased as the maximum capacitance value decreases.

2. The coordinate input apparatus according to claim 1, wherein the calculating circuit is further configured to determine that the pointer is in contact with the operating surface if the maximum capacitance value is greater than or equal to a contact threshold, and set the correction factor to a constant value regardless of the maximum capacitance value if the pointer is determined to be in contact with the operating surface.

3. The coordinate input apparatus according to claim 2, wherein the calculating circuit is further configured, if the maximum capacitance value is less than the contact threshold, to calculate the correction factor using Eq. (1), $$P = P\max - (P\max - P\min) \times (C\max - Csel)/(Ctouch - Csel) \quad (1)$$

where Pmax is a maximum value of the correction factor, Pmin is a minimum value of the correction factor, Cmax is a maximum value of the measured capacitance values, Csel is a selection-on threshold for determining if a selection operation has started, and Ctouch is the contact threshold.

4. The coordinate input apparatus according to claim 1, wherein, in each of the two axis directions, the plurality of sensor electrodes include a first sensor electrode located at an end of the capacitance sensor, an outer edge of the first electrode defining an outer boundary of a region within which the calculating circuit is allowed to calculate the position of the pointer, a center of the first sensor electrode in the axis direction corresponding to the end detecting position, and
wherein the reference position is located between the first sensor electrode and a second sensor electrode next to the first sensor electrode in the axis direction.

5. The coordinate input apparatus according to claim 1, the calculating circuit is further configured, if the maximum detecting position is the end detecting position, to set a virtual detection position outside the capacitance sensor as one of the two adjacent detecting positions to fit the quadratic curve, thereby calculating the position of the vertex.

* * * * *